(12) United States Patent
Garden et al.

(10) Patent No.: US 10,139,292 B2
(45) Date of Patent: Nov. 27, 2018

(54) CALORIMETER WITH STABILIZED TEMPERATURE

(71) Applicant: CENTRE NATIONAL DE LA RECHERCHE SCIENTIFIQUE, Paris (FR)

(72) Inventors: Jean-Luc Garden, Echirolles (FR); Pierre Brosse-Maron, La Terrasse (FR); Gaël Moiroux, Grenoble (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 254 days.

(21) Appl. No.: 15/033,012

(22) PCT Filed: Nov. 5, 2014

(86) PCT No.: PCT/IB2014/065825
§ 371 (c)(1),
(2) Date: Apr. 28, 2016

(87) PCT Pub. No.: WO2015/068115
PCT Pub. Date: May 14, 2015

(65) Prior Publication Data
US 2016/0282203 A1    Sep. 29, 2016

(30) Foreign Application Priority Data

Nov. 7, 2013   (FR) ...................... 13 60897

(51) Int. Cl.
*G01K 17/00*    (2006.01)
*G01K 17/04*    (2006.01)

(52) U.S. Cl.
CPC ........... *G01K 17/00* (2013.01); *G01K 17/006* (2013.01); *G01K 17/04* (2013.01)

(58) Field of Classification Search
CPC ....... G01K 17/00; G01K 17/006; G01K 17/04
See application file for complete search history.

(56) References Cited

U.S. PATENT DOCUMENTS

| 2010/0255588 A1* | 10/2010 | Schenker | G01K 17/04 436/43 |
| 2013/0121369 A1* | 5/2013 | Thoen | G01K 17/04 374/31 |
| 2014/0092935 A1* | 4/2014 | Lin | G01N 25/48 374/10 |

FOREIGN PATENT DOCUMENTS

JP    2004020509 A  *  1/2004

OTHER PUBLICATIONS

International Search Report dated Feb. 4, 2015, issued in corresponding International Application No. PCT/IB2014/065825, filed Nov. 5, 2015, 3 pages.

(Continued)

*Primary Examiner* — Lisa Caputo
*Assistant Examiner* — Philip Cotey
(74) *Attorney, Agent, or Firm* — Christensen O'Connor Johnson Kindness PLLC (57) ABSTRACT

The invention relates to a calorimeter including at least one measurement sensor (4) for receiving at least one sample, and at least three stages (1, 2, 3) for controlling the temperature, with decreasing size, each including a mounting (10, 20, 30) and means for controlling the temperature, the smallest stage being associated with said at least one sensor (4), in which: a first stage (1) also includes a screen (11) forming a first enclosure with the mounting (10) of said first stage; a second stage (2) is placed inside (12) said first enclosure and the mounting (20) thereof is thermally coupled with the mounting (10) of the first stage by first thermal conductances (23) comprising Peltier elements; and a third stage (3) is placed inside the second enclosure defined (Continued)

by the second stage and is thermally coupled with said second stage (2) by second passive thermal conductances (33) defining an adapted time-constant value.

19 Claims, 4 Drawing Sheets

(56) References Cited

OTHER PUBLICATIONS

Wang, S., et al., "Nano-Watt Stabilized DSC and Its Applications," Journal of Thermal Analysis and Calorimetry 79(3):605-613, Feb. 2005.

* cited by examiner

CALORIMETER WITH STABILIZED TEMPERATURE

The invention relates to the field of calorimetry and more particularly to a calorimeter with stabilized temperature, performing and designed for samples of small volume.

Many calorimeters are already known, which all have the goal of measuring amounts of heat set into play during a chemical reaction or a transformation of material.

Indeed, for example during a physical transformation, such as a phase transition, a heat exchange occurs between the material and the outer environment, the direction of which depends on the endothermic or exothermic nature of the transition process.

Accordingly, the measurement of the amounts of heat gives the possibility of accessing information on the structural condition of the material. This is why calorimeters are used in many scientific fields, in particular physics and chemistry, and therefore in the industry.

Are notably concerned, metallurgy, for studying oxidation-reduction reactions and thermal transitions, chemistry of polymers and further biochemistry and the agrifeed industry.

In particular, in biophysics, calorimetry is the only method which allows direct access to thermodynamic data (thermodynamic stability, free energy, entropy, etc . . . ) and the present patent application is interested in differential scanning calorimetry.

This analysis technique consists of measuring differences of heat exchanges between a sample to be analyzed and a reference.

A differential measurement has the advantage of removing the major portion of thermal drifts due to the environment, without adding any noise to the system. Thus, it allows only detection of the signal induced by the thermodynamic transformation to be studied.

As an example, in the field of life sciences, for studying the thermodynamic evolution of a protein, two identical cells are made, these cells being combined with the environment in a thermally equivalent way. One of them is filled with a buffer solution volume, forming the reference, the other one being filled with a solution comprising the buffer solution and the protein, making up the sample.

In practice, both cells are placed in an oven, the temperature of which changes overtime in a determined way, generally according to ramps. The latter will cause a physical transformation of the sample and therefore an exchanged heat flow between the sample and the oven. A differential measurement between both measurement cells gives the possibility of determining the heat flow difference between the sample and the reference and of therefore directly obtaining the useful signal generated by the protein.

Known apparatuses generally use the differential scanning calorimetry or DSC wherein calibration prior to the measurement and sweeping of an inert gas are provided for avoiding any reaction of the sample with the atmosphere of the oven.

These apparatuses have brought satisfaction for a long time since they not only allow measurement of the absorbed or released amount of heat during a phase transition but also observing more complicated phase changes, like glassy transitions.

Mention may notably be made of the calorimeters marketed by Setaram, Mettler Toledo, Netzsch, TA instruments or MicroCal for the most important among them, with only DSC calorimeters dedicated to lifestyle sciences at TA instruments or MicroCal.

The latter however have drawbacks which notably relate to the minimum sample volume, required so that the sensor may carry out a measurement. Indeed, although the volume in the measurement area is of only about hundred microliters, the minimum volume is of the order of one milliliter, in order to take into account both the volume of the measurement cell and the minimum volume required for bringing the product into the cell.

This minimum volume proves to be prohibitive in the field of life sciences or in the pharmaceutical field, wherein the samples to be studied are available in very small amounts, notably because of the cost of their synthesis. Further, it is preferable that the concentration of sample molecules be relatively low, so as to limit problems of biochemical interaction and aggregation.

Mettler Toledo has recently marketed a calorimeter of the DSC type which may operate with tiny amounts of samples and with scanning rates ranging up to $10^5$ K/s, but these instruments are only adapted to measurements on solid samples.

Document FR-2 977 034 describes a differential calorimetric measurement sensor giving the possibility of carrying out measurements on liquid or solid samples, having a volume of the order of one microliter. Its use contributes to overcoming the drawbacks of known calorimeters.

However, for this, it is further necessary that the calorimeter provide to such a sensor, a thermal environment of very high stability.

In other words, in order to carry out nanocalorimetric measurements on sample volumes of the order of one microliter, the calorimeter should give the possibility of obtaining, at the sensor, a temperature stability of the order of a few tens of microkelvins in a ramp mode or in an isothermal mode.

Failing to do this, the useful signal delivered by the sensor is too weak relatively to the noise and the measurement is not significant.

Now, if known calorimeters provide a stable thermal environment to the sensors which they contain, this stability is of the order of a few millikelvins.

Mention may notably be made of apparatuses marketed under the name of Micro-DSC III by Setaram or under the name of Nano-DSC for TA Instruments.

The Micro-DSC III apparatus ensures the stability of the measurement at most of the order of 0.5 mK peak to peak. Therefore it is well suited for samples for which the volume is of the order of one milliliter but not of one microliter.

The apparatus of TA Instruments as for it ensures a stable thermal environment for samples with a minimum volume of the order of 300 μl.

Studies have already been carried out for developing calorimeters providing a more stable thermal environment.

Mention may notably be made of the article of Wang et al. «*Nano-watt stabilized DSC and its applications*» (Journal of thermal Analysis and Calorimetry, Vol. 79 (2005) 605-613).

This article describes a DSC calorimeter with high sensitivity and high resolution which comprises a series of temperature-regulated chambers and nested in each other.

This calorimeter gives the possibility of ensuring a thermal stability of the order of 2 mK peak to peak for the second chamber or 0.2 mK peak to peak for the third chamber located in the second. The thermal stability is therefore improved as compared with those of the apparatuses marketed today. However, it still does not allows correct analysis of samples for which the volume is of the order of one microliter.

The object of the invention is to overcome these drawbacks by proposing a performing calorimeter, providing a thermal environment with very high stability and notably intended for sensors designed for analyzing solid or liquid samples for which the volume is very small, i.e. of the order of one microliter.

Thus, the invention relates to a calorimeter comprising at least one measurement sensor, intended to receive at least one sample, and at least three stages for regulating the temperature, of decreasing size, each comprising a support and means for regulating the temperature, the stage of smaller size being associated with said at least one sensor, wherein:
- a first stage also comprises a screen forming a first chamber with the support of this first stage, the latter being intended to be placed in the outer environment of the calorimeter from which it is thermally decoupled, and the means for regulating the temperature of this first stage giving the possibility of isolating the inside of the first chamber from temperature variations of said outer environment,
- a second stage is placed in said first chamber and its support is thermally coupled with the support of the first stage through first thermal conductances consisting in Peltier effect elements and
- a third stage is placed inside the second chamber defined by said second stage thermally coupled with said second stage through second passive thermal conductances defining a suitable time constant value, the means for regulating the temperature of this third stage giving the possibility of obtaining temperature values required for obtaining measurements with said at least one sensor.

Preferably, the first thermal conductances are Peltier effect elements of high power and form means for thermal regulation of the second stage.

In an alternative embodiment, between the support of the first stage and that of the second stage, is placed a first other stage, thermally decoupled from said first stage.

In another alternative embodiment of the calorimeter according to the invention, between the second and third stages is placed a second other stage.

In this case, the coupling by means of the second thermal conductances is achieved between the second stage and said second other stage or between the third stage and the second other stage.

In this same other alternative, third thermal conductances are provided, which, depending on the case, are provided between the second other stage and the third stage or between the second other stage and the second stage.

These third thermal conductances define a constant power, the value of which is selected depending on the type of samples to be analyzed.

For example these are Peltier effect elements defining a cold source for the support of the second other stage or the support of the third stage.

In a preferred embodiment, the second stage also comprises a screen forming a second chamber with the support of this second stage, in which is placed said third stage and optionally said second other stage.

In another embodiment of the calorimeter, the third stage also comprises a screen forming another chamber with the support of this third stage, in which is placed said at least one sensor.

In another embodiment, said first other stage comprises a support associated with a screen, forming a chamber in which are placed the second stage, the third stage and optionally the second other stage.

In further another preferred embodiment of the calorimeter, said second other stage is associated with a screen forming a third chamber in which said third stage is placed.

The temperature regulation means of said first stage are advantageously formed with a bath with circulation of fluid, notably of water.

The temperature regulation means of the first other stage are advantageously formed with a bath with circulation of fluid, notably of the silicone oil type.

Finally, the whole volume inside the first chamber is in vacuo.

The invention will be better understood and other objects, advantages and features thereof will become more clearly apparent upon reading the description which follows and which is made with reference to the appended drawings which illustrate non-limiting exemplary embodiments of the calorimeter according to the invention and wherein:

FIG. 4 is a sectional view similar to FIG. 1 and illustrating a third alternative embodiment of the calorimeter according to the invention, FIG. 5 comprises FIGS. 5a and 5b, FIG. 5a being an experimental curve illustrating the temperature variation versus time at the second stage of the second alternative embodiment illustrated in FIG. 3, and FIG. 5b being a curve identical with FIG. 5a but with a scale enlarged by a factor 10, FIG. 6 comprises FIGS. 6a and 6b, FIG. 6a being an experimental curve illustrating the temperature variation versus time at the third stage of the second alternative embodiment illustrated in FIG. 3, and FIG. 6b being a curve identical with FIG. 6a but with a scale enlarged by a factor 10.

The elements common to the different figures will be illustrated with the same reference numbers.

Figure 1:
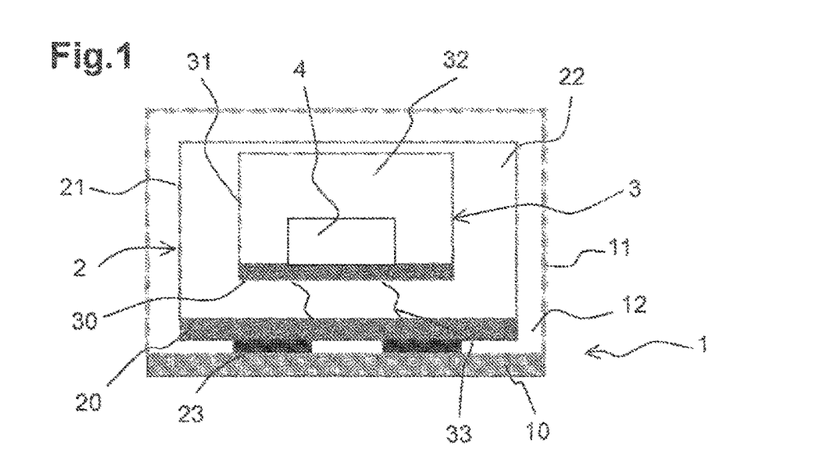
FIG. 1 is a sectional view of a first exemplary embodiment of the calorimeter according to the invention.

FIG. 1 illustrates a calorimeter according to the invention which comprises three temperature regulation stages.

The first stage 1 comprises a support 10 and a screen 11.

It therefore defines a chamber, in which are positioned the other temperature regulation stages.

This first stage is in contact with the outer environment of the calorimeter. Its first function is therefore to isolate the inside 12 of the chamber from the temperature variations of this environment.

In practice, the screen 11 is made in a material having very good heat conductivity. It is regulated in temperature via the support 10 with which it is thermally coupled. The outer wall of the screen and of the support is covered with a thermal insulator for ensuring thermal decouling between the first stage and the outer environment.

Moreover, the chamber defined by the support and the screen is leak-proof. It may therefore be connected to a pumping device for establishing a secondary vacuum in the inside 12 of the chamber, i.e. a pressure comprised between $10^{-3}$ and $10^{-7}$ mbars or between $10^{-1}$ and $10^{-5}$ Pa.

By putting the chamber in vacuo it is possible to cancel out the thermal connections by conduction and by convection between the various stages inside the chamber defined by the first stage, and also between the first stage and the others. The only parasitic thermal coupling is then thermal radiation, the calorimeter according to the invention gives the possibility of doing without it.

In practice, the chambers present inside this first chamber are also in vacuo.

The support 10 consists of a metal plate having good heat conductivity and good thermal diffusivity.

This metal may notably be aluminum.

Means for regulating temperature are associated with a support 10. These regulation means are advantageously formed with a bath with circulation of fluid, notably of water (not shown in FIG. 1), associated with a thermometer.

They give the possibility of isolating the inside of the first chamber from the temperature variations of the outer environment and thus stabilizing in temperature the whole volume inside the first chamber.

Means of this type are designed so as to regulate the temperature to within a few tens of millikelvins.

The calorimeter according to the invention comprises a second regulation stage 2, placed in the inside 12 of the first chamber.

In the example illustrated in FIG. 1, the second stage 2 comprises a support 20 and a screen 21 which define a second chamber.

However, the screen 21 may be omitted.

The support 20 of the second stage consists in a plate of a material which is a very good heat conductor.

This may notably be made in copper, like the screen 21.

The second stage is thermally coupled with the first stage via thermal conductances 23.

These thermal conductances may consist in thermal leaks associated with regulation means for example consisting in heating means associated with a thermometer or a bath with circulation of fluid associated with a thermometer.

These thermal leaks may for example be formed by mechanical supports, the geometry of the supports and the value of the heat conductivity of the material used defining a thermal conductance of a suitable value.

These thermal conductances may also consist in Peltier effect elements of great power which also fulfill the function of temperature regulation means of this second stage. By great power Peltier effect elements are understood one or several Peltier effect elements having a cold power required for absorbing all the heat power which comes from the stages nested in stage 1. An order of magnitude may be of several hundred watts up to one kilowatt.

The Peltier effect elements are associated with a thermometer.

They define a time constant comprised between 100 and 1,000 s.

Elements of this type are designed in order to regulate the temperature from a few millikelvins to within about tens of millikelvins.

It is advantageous to provide Peltier effect elements for regulating the temperature of the second stage. Indeed, these elements give the possibility of considerably lowering the temperature of the support 20, the temperature may be less than 0° C.

This gives the possibility of obtaining a low temperature also at the level of the support 30.

Generally, the cold face of the Peltier effect elements 23 is in contact with the support 20 and the hot face is in contact with the support 10. The current powering the elements 23 is adjusted according to the temperature of the second stage 2, in order to suitably regulate the temperature of this second stage 2.

The Peltier effect elements 23 also have the function of absorbing the regulation powers of the regulation stage(s) placed in the inside 22 of the chamber defined by this second stage.

Finally, the calorimeter according to the invention comprises a third stage 3 which is placed in the inside 22 of the chamber defined by the second stage.

This third stage 3 comprises a support 30 and a screen 31 which define a third chamber. In the inside 32 of this third chamber is placed a differential calorimetric measurement sensor 4 for example of the type described in document FR-2 977 034.

The invention is not limited to this application.

The chamber may notably comprise several differential measurement sensors, a sensor with at least two thermometers or further a non-differential sensor with a single thermometer.

The support 30 and the screen 31 are made in a material which is a very good heat conductor, notably copper.

The screen 31 may be omitted.

This third stage 3 is regulated in temperature by heating means (not shown in FIG. 1). These heating means give the possibility of establishing the required temperature levels for proper operation of the sensor 4.

Thus, these means may generate a temperature ramp, for example comprised between 0.01° C./min and 100° C./min, or further establish an isothermal mode.

It should be indicated here that the sensor described in document FR 2 977 034 operates well with fast temperature ramps.

When the elements 23 are Peltier effect elements with a high power, the temperature of the support 30 may be less than 0° C., notably comprised between −50° C. and 0° C.

This gives the possibility of having a greater range of temperatures for setting the starting temperature of the temperature ramp which will be applied at the third stage.

Moreover, this third stage 3 is thermally coupled with the second stage 2, via thermal conductances 33.

These conductances are suitably selected for defining a time constant comprised between 10 s and several hundred seconds. In practice, this time constant is selected so as to be relatively high, for example of the order of 100 seconds.

Unlike the Peltier effect elements, these thermal conductances 33 are passive, i.e. they cannot be used for regulating the temperature of the third stage.

They may notably have the shape of a U and be made in annealed copper.

It should be noted that these thermal conductances do not contribute to the mechanical rigidity of the assembly since they are flexible.

Thus, these thermal conductances 33 gives the possibility of generating a highly efficient thermal isolation between the second stage and the third stage, the latter thus being able to be regulated to within a few 0.01 mK.

In practice, this gives the possibility of generating a thermal gradient between the second stage and the third stage, typically of the order of 1° C., by specific heating means provided at the support 30. They are designed for providing a power P such that $P=K\Delta T$, wherein K is the value of the thermal conductances 33 and $\Delta T$ is the temperature gradient.

The association of these three regulation stages gives the possibility of obtaining a temperature stability of the order of a few microkelvins within the chamber containing the differential calorimetric measurement sensor.

This result is notably due to the presence of the thermal conductances 33 between the second stage 2 and the third stage 3, these thermal conductances ensuring very great isolation of the third stage with respect to the outer thermal perturbations.

Figure 2:
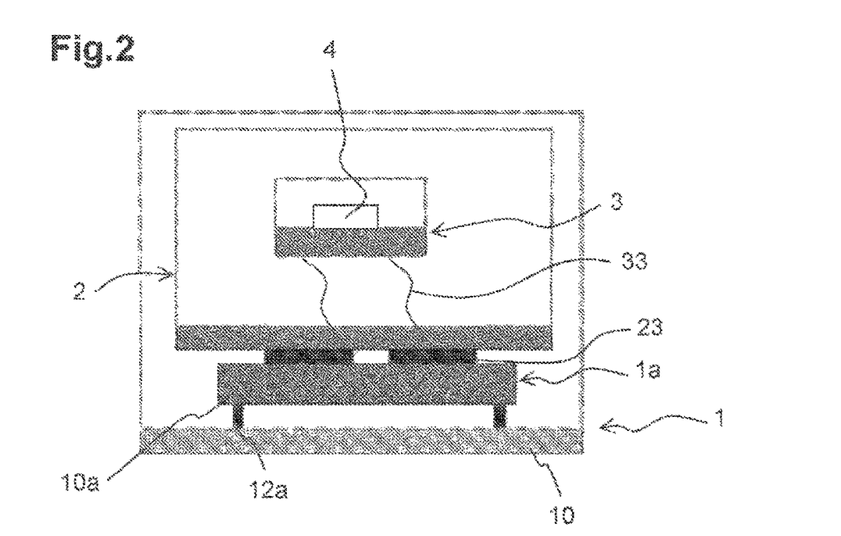
FIG. 2 is a sectional view similar to FIG. 1 and representing a first alternative embodiment of the calorimeter according to the invention.

FIG. 2 illustrates an alternative embodiment of the calorimeter according to the invention.

FIG. 2 shows that a first other stage for temperature regulation 1a is positioned between the first stage 1 and the second stage 2.

This stage 1a gives the possibility of better isolating the second stage 2 from the outer environment.

This stage 1a comprises a support 10a which is mechanically connected to the support 10, for example by rods 12a.

The mechanical connection is designed for avoiding any thermal coupling between the supports 10 and 10a. For this, the rods may notably be made in stainless steel or in plastic.

This support 10a is also formed with a metal plate having very good heat conductivity, notably copper.

This support 10a is thermally regulated by a bath with circulation of fluid, notably silicone oil (not shown in FIG. 2). This gives the possibility of regulating the support 10a at temperatures below 0° C.

As indicated earlier, means of this type are designed for regulating the temperature to within tens of millikelvins.

A screen (not shown in FIG. 2) may be associated with the support 10a. It is then made in a material having very good heat conductivity.

This other stage 1a is thermally decoupled from the first stage 1, the means for regulating in temperature the first stage 1 and the stage 1a being independent of each other and the supports 10 and 10a being mechanically connected without any thermal coupling.

FIG. 2 shows that, in this alternative embodiment, it is stage 1a which is used as a thermal bath for the elements 23.

In other words, this other stage 1a is a thermal reference for the second stage 2 and this at a stable temperature.

This reference temperature is for example less than 0° C.

The second stage 2 and the third stage 3 have the same structure as the one described with reference to FIG. 1. They will therefore not be described in more detail.

Figure 3:
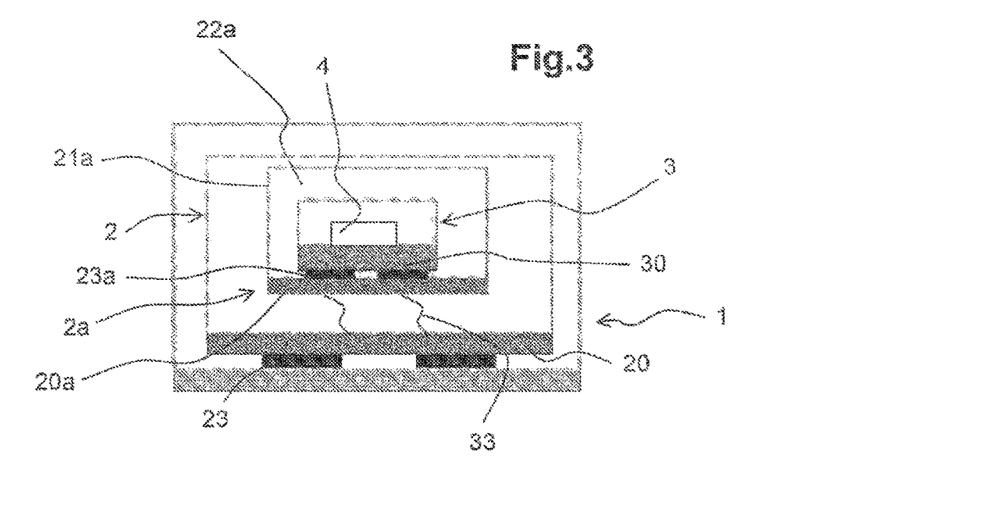
FIG. 3 is a sectional view similar to FIG. 1 and illustrating a second alternative embodiment of the calorimeter according to the invention.

FIG. 3 illustrates another alternative embodiment of the calorimeter described in FIG. 1.

As shown by FIG. 3, the first stage 1 and the second stage 2 have the same structure as the one which was described with reference to FIG. 1. Both of these stages will therefore not be described again in detail.

In the illustrated alternative, a second other regulation stage 2a is provided between the second stage 2 and the third stage 3.

This other stage 2a comprises a support 20a and a screen 21a defining a chamber.

There again, the support 20a and the screen 21a are made in a material which is a very good heat conductor. This may notably be copper.

In the inside 22a of this chamber is placed the third stage 3 which contains the sensor 4.

In practice, the screen 21a may be omitted.

Thus, in this alternative, the thermal conductances 33 are not located between the support 20 of the second stage and the support 30 of the third stage, but between the support 20a of the additional stage 2a and the support 20 of the second stage 2.

These thermal conductances 33 fulfill the same function as previously, i.e. define a time constant comprised between 10 s and several hundred seconds and notably of the order of about hundred seconds. This gives the possibility of achieving a very efficient thermal isolation between the second stage 2 and the additional stage 2a. It is then possible to regulate in a highly accurate way the temperature of the additional stage 2a, by the regulation means which are associated with it (not shown in FIG. 3).

Moreover, between the support 20a and the support 30 of the third stage, thermal conductances 23a are provided, formed here by Peltier effect elements.

These elements 23a give the possibility of providing constant power at the third stage 3, which allows definition of an average temperature before a measurement is carried out by the sensor 4.

They also give the possibility of defining a suitable time constant, comprised between 100 and 1,000 s.

In practice, these Peltier effect elements 23a may be supplied with current so as to define an average experiment starting temperature which is negative, notably comprise between −30° C. and 0° C.

The Peltier effect elements may be used for regulating the temperature of the third stage.

However, within the scope of the invention, it appears advantageous to not use these Peltier effect elements for regulating the temperature of the third stage 3.

The regulation of this third stage is then carried out by means of heating elements and of a thermometer.

The support 20a is mechanically connected to the support 20 via Belleville washers (not shown in FIG. 3).

These washers give the possibility of ensuring a constant mechanical force on the Peltier effect elements 23 without thermally coupling the supports 20a and 20 since they are not heat conducting.

Of course, the calorimeter illustrated in FIG. 3 may also be modified so as to include the alternative illustrated in FIG. 2.

Figure 4:
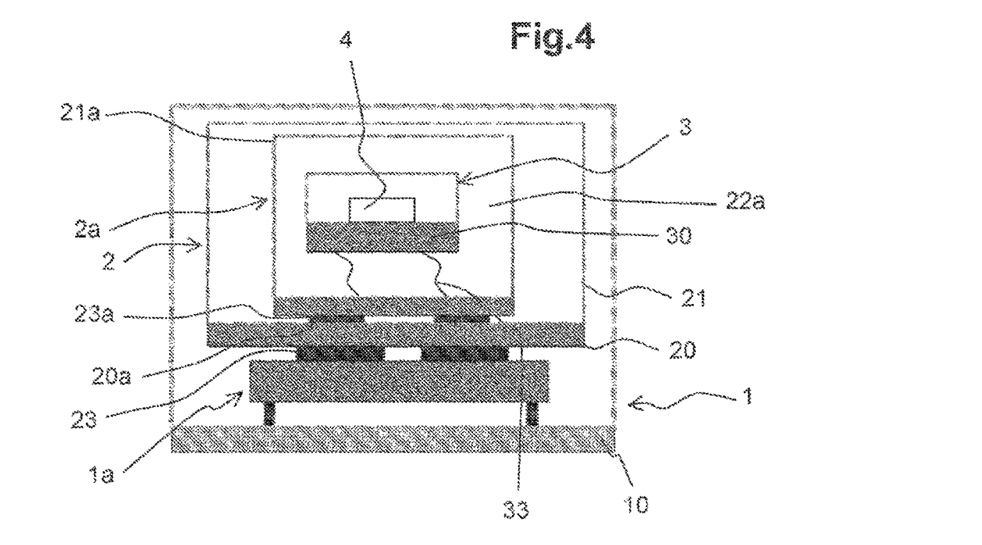

FIG. 4 further illustrates another alternative of the calorimeter illustrated in FIG. 1.

This calorimeter shows the alternative embodiment illustrated in FIG. 2. Indeed, an additional stage 1a is provided between the first stage 1 and the first stage 2.

These three stages 1, 1a and 2 have the same structure as the one which was described with reference to FIGS. 1 and 2 and therefore they will not be described again in more detail.

FIG. 4 shows that the calorimeter includes another additional stage 2a, as this was described with reference to FIG. 3.

However, in this alternative embodiment, the thermal conductances 33 are provided between the additional stage 2a and the third stage 3 and not between the additional stage 2a and the second stage 2. However they fulfill the same function as the one which was described with reference to FIG. 3.

Moreover, the Peltier effect elements 23a are provided between the support 20a and the support 20 of the second stage and not between the support 30 of the third stage and the support 20a of the additional stage 2a, like in FIG. 3.

Thus, the calorimeter according to the invention consists of several temperature regulation stages which are nested in each other. Therefore this is a configuration of the "Russian dolls" type.

Generally, when a screen is associated with a support, it is advantageous that it be perfectly coupled with this support in order to ensure a homogeneous temperature in the thereby defined chamber.

Each regulation stage gives the possibility of attenuating by a given factor the temperature variations of the room in which is placed the calorimeter.

In such a system, the immediate environment of a stage is defined by the stage which supports it or contains it.

Moreover, the regulations of each stage are independent of each other and do not perturb their immediate environment.

In practice, each regulation stage gives the possibility of attenuating by a factor 10 to 100 the variations of its immediate environment.

Notably by the presence of the thermal conductances 33, the calorimeter according to the invention ensures a temperature stability of the order of $10^{-5}$ K at the measurement sensor 4.

Thus, the calorimeter according to the invention gives the possibility of improving the temperature stability by a factor comprised between 10 and 100, as compared with known apparatuses.

Figure 5A:
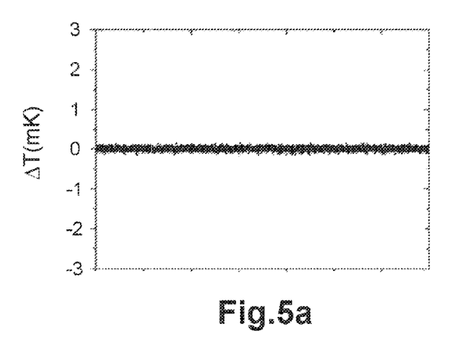
Figure 5B:
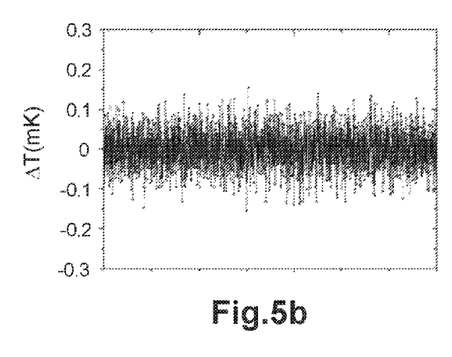
Figure 6A:
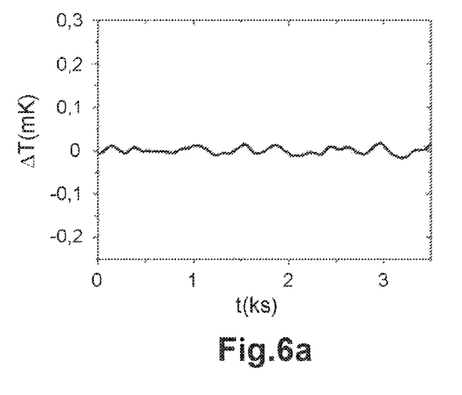
Figure 6B:
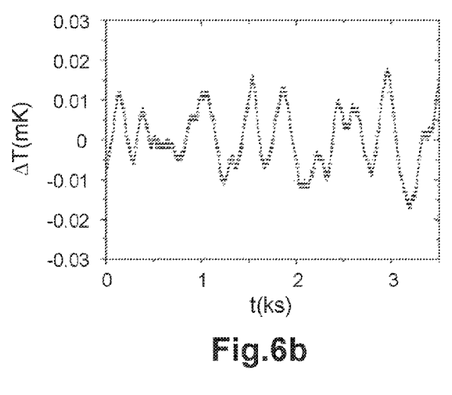

This notably appears from FIGS. 5 and 6 which show the temperature regulation versus time of the stages 2a and 3 of the calorimeter illustrated in FIG. 3, both of these stages being regulated around a constant temperature.

FIG. 5 shows that the temperature fluctuation at the stage 2a is of ±0.1 mK, while FIG. 6 shows that the temperature fluctuation is of ±0.01 mK at stage 3.

The calorimeter according to the invention therefore gives the possibility of improving the temperature stability of a factor 10 as compared with the calorimeter described in the aforementioned article of Wang.

It therefore gives the possibility of carrying out measurements on samples, for which the volume is of the order of one microliter, by using a suitable measurement sensor, even for materials transmitting small signals.

Figure 7:
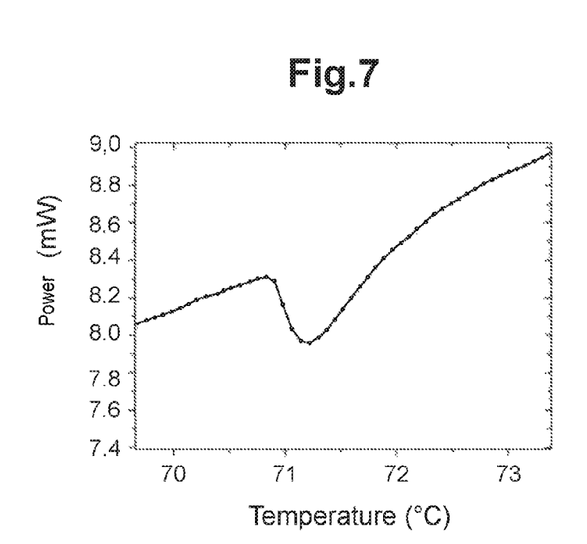
FIG. 7 is an experimental curve relating to a protein sample of alpha-lactalbumin placed in the calorimeter according to the invention and illustrates the power released by the sample versus temperature.

This emerges from FIG. 7 which is a thermal denaturation test of a protein, alpha-lactalbumin.

A sample of this protein was the subject of a differential temperature measurement in a calorimeter according to the invention, as illustrated in FIG. 3.

This sample have a mass of proteins of 20 µg diluted in a solvent in order to obtain a volume of 2 µl. Its protein concentration is therefore 10 mg/ml. It was subject, like the reference, to a temperature ramp of 5° C./min.

The calorimeter gave the possibility of measuring, verus time, a differential temperature from which is inferred a power (mW) illustrated in FIG. 7.

The curve illustrated in FIG. 7 shows that at a temperature of 71°, the relevant protein is denaturated.

The calorimeter according to the invention therefore actually gives the possibility of carrying out measurements with samples of very small volume, even with products emitting small signals, such as biological materials.

It should be emphasized that in the aforementioned article of Wang, the tested material is not a biological sample.

This proves to be particularly of interest in the field of biophysics and life sciences where the temperature deviations to be measured are minute.

The reference signs inserted after the technical characteristics appearing in the claims have the only purpose of facilitating understanding of the latter and cannot limit the scope thereof.

The invention claimed is:

1. A calorimeter comprising at least one measurement sensor, intended to receive at least one sample, and at least three stages for regulating temperature, of decreasing size, each comprising a support and temperature regulation means, the stage of smaller size being associated with said at least one measurement sensor, wherein:
   a first stage comprising a support and a screen, the first stage defining a first chamber and isolating an inside of the first chamber from temperature variations of an outer environment of the calorimeter, and the temperature regulation means of the first stage allowing isolation of an inside of the first chamber from temperature variations of said outer environment,
   a second stage is placed inside said first chamber and its support is thermally coupled with the support of the first stage by first thermal conductances, said first thermal conductances consisting of Peltier effect elements,
   a third stage is placed inside a second chamber defined by the second stage and is thermally coupled with said second stage by second passive thermal conductances defining a time constant of between 10 seconds and several hundred seconds, the temperature regulation means of the third stage providing values of temperature required for obtaining measurements by said at least one measurement sensor.

2. The calorimeter according to claim 1, wherein the first thermal conductances are Peltier effect elements having a cold power for absorbing heat which comes from stages nested in the first stage and form means for regulating the temperature of the second stage.

3. The calorimeter according to claim 1, wherein, between the support of the first stage and the support of the second stage, is placed a first other stage, thermally decoupled from said first stage.

4. The calorimeter according to claim 3, wherein said first other stage comprises a support associated with a screen, forming a chamber in which are placed the second stage and the third stage.

5. The calorimeter according to claim 3, wherein the temperature regulation means of the first other stage are formed by a bath with circulation of a circulation fluid.

6. The calorimeter of claim 5, wherein the circulation fluid is a silicon oil.

7. The calorimeter according to claim 1, wherein between the second and third stages is placed a second other stage.

8. The calorimeter according to claim 7, wherein the second thermal conductances are placed between the support of the second stage and the support of the second other stage, third thermal conductances being provided between the support of the second other stage and the support of the third stage.

9. The calorimeter according to claim 8, wherein the third thermal conductances define a constant power, the value of which is selected depending on the type of samples to be analyzed.

10. The calorimeter according to claim 9, wherein said third thermal conductances are Peltier effect elements defining a cold source for the support or the support.

11. The calorimeter according to claim 7, wherein the second thermal conductances are placed between the support of the second other stage and the support of the third stage, third thermal conductances being provided between the support of the second stage and the support of the second other stage.

12. The calorimeter according to claim 7, wherein said second other stage is associated with a screen forming a third chamber in the inside of which is placed said third stage.

13. The calorimeter of claim 7, wherein the second stage also comprises a screen forming a second chamber with the support of this second stage, inside of which is placed said second other stage.

14. The calorimeter of claim 7, wherein between the second and third stages is placed a second other stage, and wherein said first other stage comprises a support associated with a screen, forming a chamber in which is placed the second other stage.

15. The calorimeter according to claim 1, wherein the second stage also comprises a screen forming a second chamber with the support of this second stage, inside of which is placed said third stage.

16. The calorimeter according to claim 1, wherein said third stage also comprises a screen forming another chamber with the support of this third stage, in the inside of which is placed said at least one measurement sensor.

17. The calorimeter according to claim 1, wherein the temperature regulation means of said first stage are formed by a bath with circulation of a circulation fluid.

18. The calorimeter of claim 17, wherein the circulation fluid is water.

19. The calorimeter according to claim 1, wherein all the volume in the inside of the first chamber is in vacuo.

* * * * *